(12) United States Patent
Iwaki

(10) Patent No.: US 9,398,530 B2
(45) Date of Patent: Jul. 19, 2016

(54) TERMINAL DEVICE AND CONTROL METHOD AND PROGRAM THEREFOR

(71) Applicant: NEC CASIO MOBILE COMMUNICATIONS, LTD., Kawasaki-shi, Kanagawa (JP)

(72) Inventor: Yoshihiro Iwaki, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/647,921

(22) PCT Filed: Jun. 19, 2013

(86) PCT No.: PCT/JP2013/003813
§ 371 (c)(1),
(2) Date: May 28, 2015

(87) PCT Pub. No.: WO2014/087551
PCT Pub. Date: Jun. 12, 2014

(65) Prior Publication Data
US 2015/0312854 A1    Oct. 29, 2015

(30) Foreign Application Priority Data

Dec. 3, 2012    (JP) .................. 2012-264306

(51) Int. Cl.
*H04W 52/02*    (2009.01)
*G06F 1/32*    (2006.01)
*H04M 1/02*    (2006.01)

(52) U.S. Cl.
CPC ............ *H04W 52/0209* (2013.01); *G06F 1/32* (2013.01); *G06F 1/3265* (2013.01); *H04M 1/0202* (2013.01); *H04W 52/0229* (2013.01); *Y02B 60/1242* (2013.01); *Y02B 60/50* (2013.01)

(58) Field of Classification Search
CPC . H04W 52/0209; H04W 52/02; H04W 52/00; H04W 52/0274; H04W 52/027; H04W 52/028; H04W 52/0277; H04W 52/0267; G06F 1/32; G06F 1/3203; G06F 1/3234; G06F 1/3246; G06F 1/3262; G06F 1/3265; G06F 1/3287; H04M 1/73
USPC ......................................... 455/574, 572, 573
See application file for complete search history.

(56) References Cited

U.S. PATENT DOCUMENTS 9,098,275 B2 * 8/2015 Chun .................... G06F 1/3203
2005/0190711 A1 9/2005 Morimoto
(Continued)

FOREIGN PATENT DOCUMENTS

JP    10-336099 A    12/1998
JP    2002-305475 A    10/2002
(Continued)

OTHER PUBLICATIONS

International Search Report for PCT Application No. PCT/JP2013/003813, mailed on Aug. 20, 2013.

*Primary Examiner* — Siu Lee

(57) ABSTRACT

A terminal device provided with an acquisition section for acquiring information on a network, a display section for displaying the information, and a control section for controlling to stop or suppress operation of a hardware section excluding at least the acquisition section. The operation of the hardware section can be stopped or suppressed while information is being acquired from the network, whereby power consumption can be suppressed by the amount of the operation stop or the operation suppression, and the battery life can be extended. Accordingly, an appropriate and suitable transition to a power-saving state can be made in accordance with a usage situation regardless of power-saving transition time, whereby unnecessary power consumption can be suppressed.

5 Claims, 12 Drawing Sheets

(56) References Cited

U.S. PATENT DOCUMENTS

| | | | | |
|---|---|---|---|---|
| 2009/0244087 | A1* | 10/2009 | Okano | H04W 52/027 345/589 |
| 2010/0167787 | A1* | 7/2010 | Weisbrod | H04M 1/72544 455/566 |
| 2011/0260958 | A1* | 10/2011 | Shabel | G06F 1/3203 345/102 |
| 2012/0151236 | A1* | 6/2012 | Vandeputte | G06F 1/3209 713/324 |
| 2013/0138776 | A1* | 5/2013 | Yamashita | H04L 67/06 709/219 |

FOREIGN PATENT DOCUMENTS

| | | |
|---|---|---|
| JP | 2003-087863 A | 3/2003 |
| JP | 2005-244604 A | 9/2005 |
| JP | 2007-214628 A | 8/2007 |
| JP | 2010-171902 A | 8/2010 |

* cited by examiner

FIG. 11
(a)
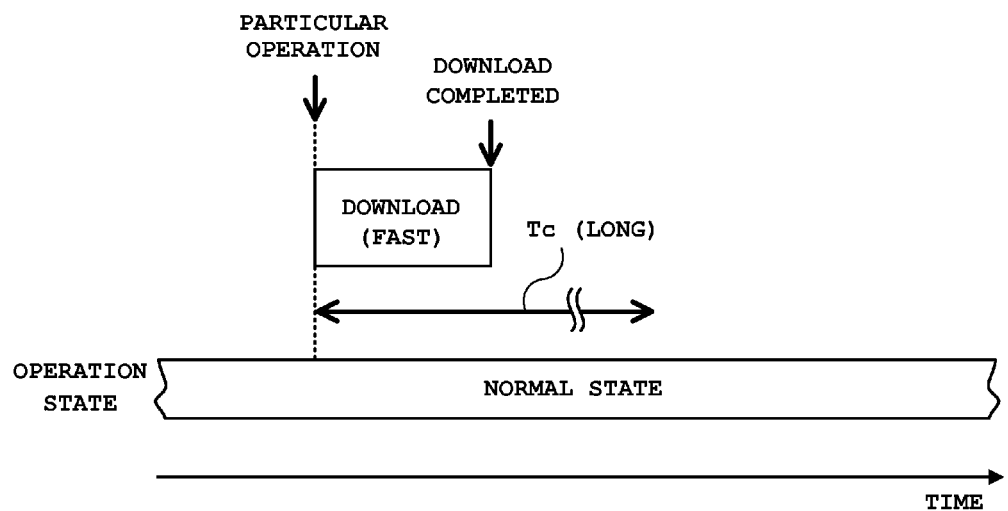
(b)
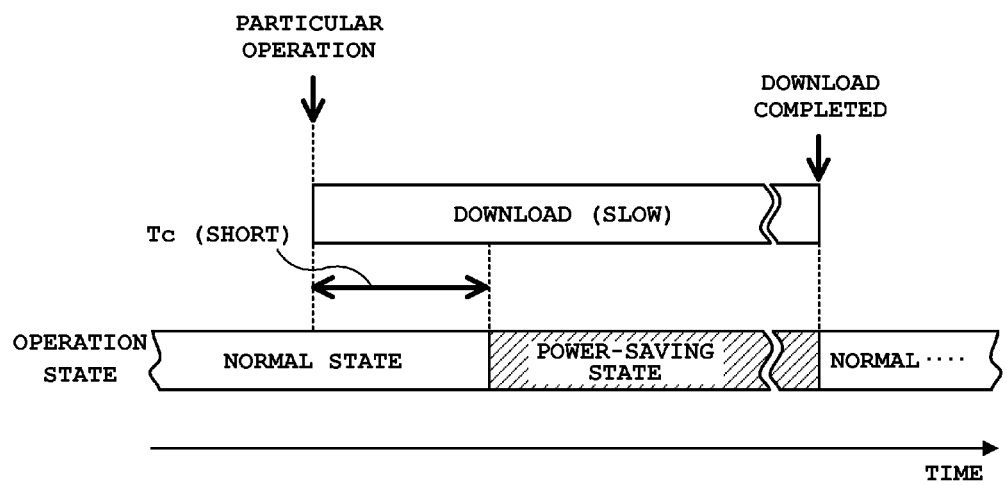

TERMINAL DEVICE AND CONTROL METHOD AND PROGRAM THEREFOR

This application is a National Stage Entry of PCT/JP2013/003813 filed on Jun. 19, 2013, which claims priority from Japanese Patent Application 2012-264306 filed on Dec. 3, 2012, the contents of all of which are incorporated herein by reference, in their entirety.

TECHNICAL FIELD

The present invention relates to a terminal device and control method and program therefor, and particularly relates to a terminal device which can be used as a network terminal, and a control method and a program therefor.

BACKGROUND ART

Recently, highly-functional portable phones called smartphones have been widely used. The smartphones, which have not only a telephone function but also a network terminal function for e-mails, a browser, and the like, are highly-usable portable-type communication terminals that can access various resources by being connected to a network such as the Internet whenever required.

The smartphones are highly usable as described above, but have defects that the battery lives are short. This is because the smartphones are highly functional compared with conventional portable phones and therefore the usage frequencies thereof tend to be high.

Most of the electric power of a portable terminal device such as a smartphone is used by the back-surface light source (so-called backlight) of its liquid crystal display panel. Therefore, when not operated for "a predetermined amount of time", the portable terminal generally enters a so-called power-saving state (also referred to as a standby state) where the backlight is turned off. The portable terminal returns from the power-saving state to a normal state (a state where the backlight is on) in response to a pressing operation performed on a physical button such as a power switch. Hereinafter, the above-described predetermined amount of time will be referred to as "power-saving transition time" for convenience of explanation.

The power-saving transition time is a constant value determined in advance or a variable value that can be set by a user. The counting of the power-saving transition time is restarted every time a user operation is performed. Accordingly, the transition to the power-saving state is made when an elapsed time from a preceding user operation reaches the power-saving transition time. For example, in a configuration where the power-saving transition time is two minutes, the backlight is turned off for a transition to the power-saving state two minutes after a preceding user operation.

However, in such a measure for electric-power saving, the power-saving transition time is a "fixed value" that is a constant value (even a variable value that can be set by a user is treated as a fixed constant value after being set). Therefore, there is a defect that unnecessary electric power is inevitably consumed until the power-saving transition time elapses (two minutes in the above-described example). In this regard, in many smartphones, the power-saving transition time can be set by the users. Therefore, the above-described defect can be solved by shortening the power-saving transition time from, for example, two minutes to one minute or to several tens of seconds or shorter. However, on the other hand, when the power-saving transition time is shortened, a situation where the backlight is turned off while the user is viewing a screen occurs easily, which causes a new defect that the usability is deteriorated.

Therefore, a technique is required by which the power-saving transition time can be dynamically changed in accordance with the usage situation of the smartphone.

Examples of related techniques capable of dynamically changing the power-saving transition time include a technique where power-saving control (such as backlight turn-off: the same applies hereafter) is started comparatively late when key operations are slow, and is started comparatively early when key operations are fast in accordance with the speeds of key operations (fast key operation, slow key operation) by each user (see Patent Document 1 described below); a technique in which, if a battery remaining amount is low when data is to be downloaded from a network, the download is not executed (see Patent Document 2 described below); and a technique where a table is provided which stores power-saving setting information, such as the turning-off of a backlight, for each section and, when power-saving control is to be performed, the power-saving settings of the sections including the backlight are collectively performed by reference to the table (see Patent Document 3 described below).

PRIOR ART DOCUMENTS

Patent Documents

Patent Document 1: JP 2007-214628
Patent Document 2: JP 2003-087863
Patent Document 3: JP 2002-305475

SUMMARY OF INVENTION

Problem to be Solved by the Invention

However, the techniques described in Patent Documents 1 to 3 are merely a technique for performing power-saving control in accordance with the speeds of key operations by individual users (Patent Document 1), a technique for not performing the download of data when a battery remaining amount is low (Patent Document 2), or a technique for collectively performing power-saving settings with reference to a table (Patent Document 3). Therefore, these techniques have a problem in that the above-described defect (unnecessary power consumption until transition to a power-saving state is made is inevitable) cannot be solved.

Accordingly, an object of the present invention to provide a terminal device and control method and program therefor by which transition to a power-saving state can be appropriately and suitably made in accordance with a usage situation regardless of a power-saving transition time, whereby unnecessary power consumption can be suppressed.

Means for Solving the Problem

A terminal device of the present invention comprising: an acquisition section for acquiring information on a network; a display section for displaying the information; and a control section for controlling to stop or suppress operation of a hardware section excluding at least the acquisition section while the information is being acquired by the acquisition section.

A control method for a terminal device of the present invention comprising: an acquisition step of acquiring information on a network; a display step of displaying the information; and a control step of controlling to stop or suppress operation of at least a hardware section not required for the acquisition step while the information is being acquired by the acquisition step.

A program of the present invention is characterized by a non-transitory computer-readable storage medium having a program stored thereon that is executable by a computer of a terminal device to actualize functions comprising: an acquisition section for acquiring information on a network; a display section for displaying the information; and a control section for controlling to stop or suppress operation of a hardware section excluding at least the acquisition section while the information is being acquired by the acquisition section.

Effect of the Invention

According to the present invention, a terminal device and control method and program therefor can be provided by which transition to a power-saving state can be appropriately and suitably made in accordance with a usage situation regardless of a power-saving transition time, whereby unnecessary power consumption can be suppressed.

BRIEF DESCRIPTION OF DRAWINGS

FIGS. 11(a) and 11(b) are explanatory diagrams of the particular operation processing in the fourth embodiment.

DESCRIPTION OF EMBODIMENTS

Hereinafter, embodiments of the present invention will be described with reference to the drawings by taking the application of the present invention to a highly-functional portable phone called a smartphone as an example.

Figure 1:
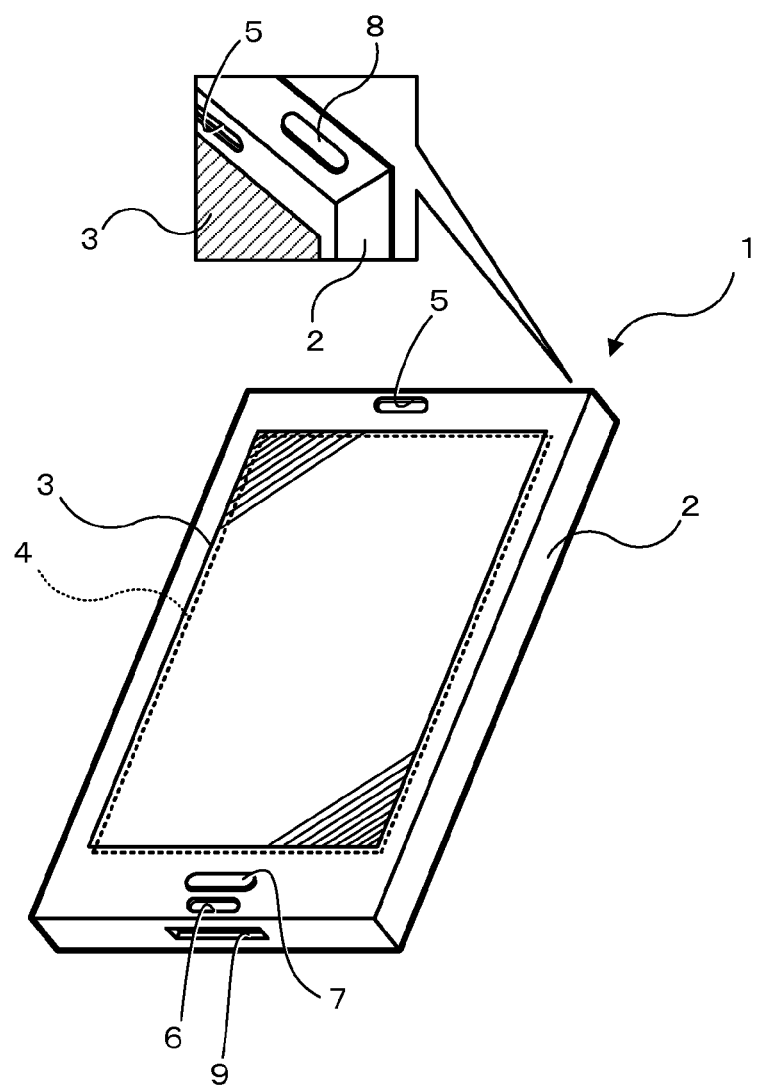
FIG. 1 is an external view of a portable phone common to embodiments.

FIG. 1 is an external view of a portable phone common to the embodiments. In this drawing, the portable phone 1 that is one form of a portable terminal has a housing 2 having a shape suitable for being held by a hand, such as a thin box shape. The main surface (the front surface that serves as a main operation target) of the housing 2 has a transmission-type touch panel 3 provided thereon, and a two-dimensional display device 4 such as a liquid crystal display or an organic EL (Electro-Luminescence) panel is provided on the back surface of this touch panel 3. In a surface of the housing 2 on the upper end side of the touch panel 3, a speaker 5 that serves as a telephone receiver is provided, and a microphone 6 that serves as a telephone transmitter and a physical key 7 that is arbitrarily operated by a user are provided on a surface of the housing 2 on the lower end side of the touch panel 3. Also, the upper-side surface of the housing 2 has a power switch 8 provided thereon, and a connector 9 for battery charging or external connection is provided in the lower-side surface of the housing 2.

Figure 2:
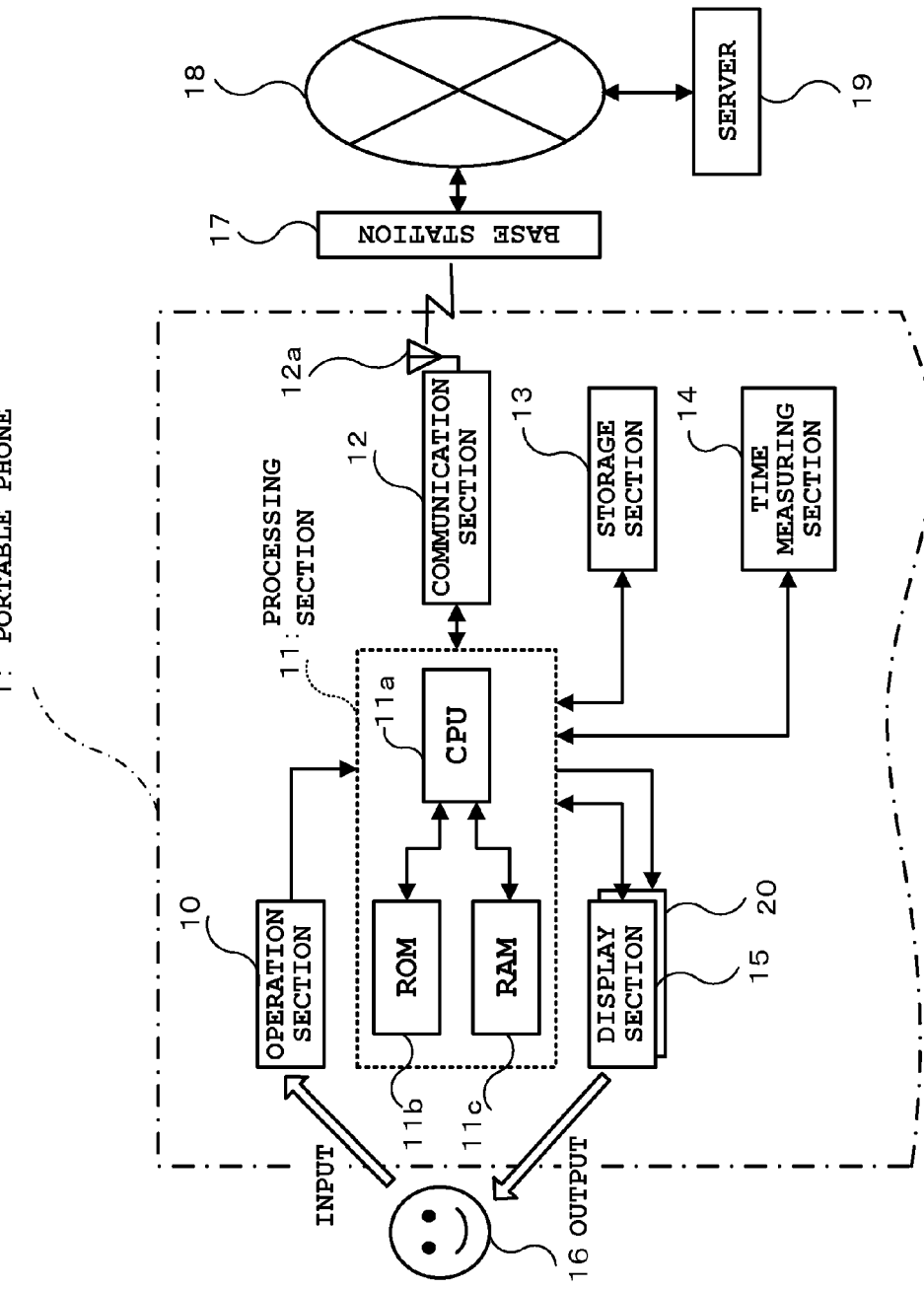
FIG. 2 is a brief hardware structural diagram of the portable phone 1.

FIG. 2 is a brief hardware structural diagram of the portable phone 1. In this diagram, the portable phone 1 is provided with hardware sections such as an operation section 10, a processing section 11, a communication section 12, a storage section 13, a time measuring section 14, and a display section 15. Note that, in addition to these sections, a power supply section including a batter, etc. is provided therein. However, it is omitted for simplification of the diagram. In the diagram, the lower side of a dashed-dotted-line figure representing the portable phone 1 has been illustrated by a wavy line, which is indicating that the hardware sections constituting the portable phone 1 include (or may include) other hardware sections. The other hardware sections are various sections, which may be, for example, a camera section or a GPS (Global Positioning System) section.

The operation section 10 is a means for providing an input interface for a user 16 (operator of the portable phone 1), which is constituted by the touch panel 3, the physical key 7, and the power switch 8 of FIG. 1. This operation section 10 generates required operation signals in response to operations of the user 16 and outputs them to the processing section 11.

The communication section 12 is a wireless communication means for phone or data communication. Although its communication standard generally uses a first-generation (1G) to a fourth-generation standard (4G) of portable phones or a next-generation standard, the present invention is not limited thereto, and any standard can be used as long as it can enable phone calls and data communication. For example, a PHS (Personal Handyphone System) standard of simplified portable phones may be used. Alternatively, a short-distance wireless communication standard such as Wi-Fi (Wi-Fi: registered trademark) or Bluetooth (Bluetooth (registered trademark)) may be used.

The communication section 12 may include a wired communication means in addition to the wireless communication means. Under control by the processing section 11, this communication section 12 wirelessly transmits or receives digital data to or from a nearest base station 17 via an antenna 12a, or transmits or receives digital data by wire communication by the connector 9 of FIG. 1 being connected by a cable to a router at home or the like.

The base station 17 is connected to a network 18 such as the Internet, and a system (hereinafter, server) 19 that provides some sort of service in response to requests from clients is connected to the network 18.

In addition to the function of a phone, the portable phone 1 has a function as a client, that is, a function of a network terminal, whereby required services can be requested to the server 19. These services include various services. Examples of typical services herein include a service for viewing content such as a homepage and a service for downloading data such as image files (hereinafter, Web services). The uses of the Web services will be described later in detail.

The storage section 13 is a rewritable and non-volatile (stored contents are not cleared even when the power is turned off) storage means, which is structured by, for example, a storage device such as a magnetic disk or a flash memory.

The time measuring section 14, which is a means for time keeping (measuring time), starts clocking time in response to an instruction from the processing section 11 and, when time appropriately set by the processing section 11 elapses, notifies the processing section 11 of it.

The display section 15 is a means for providing an output interface for the user 16, which is structured by the two-dimensional display device 4 of FIG. 1. The display section 15 visualizes information appropriately outputted from the processing section 11 and provides it to the user 16.

Herein, if the two-dimensional display device 4 of FIG. 1 is a device of the transmission type (typically, a liquid crystal display), this transmission-type two-dimensional display device 4 is a display device that does not emit light and therefore requires some sort of alight source (generally, a back-surface light source, which will be hereinafter referred to as a backlight 20). However, the power consumption of the backlight 20 is considerably larger than that of the other parts, and therefore power-saving control for the backlight 20 is essential for improving the battery life.

The processing section 11 is a program-controlled-type control element including a computer or microcomputer (hereinafter, CPU) 11a, a read-only semiconductor memory (hereinafter, ROM) 11b, a high-speed semiconductor memory (hereinafter, RAM) 11c, and peripheral circuits not shown. The processing section 11 integrally manages various control operations of the portable phone 1 including usage control for Web services and power-saving control for the backlight 20 by loading control data such as a control program stored in the ROM 11b in advance into the RAM 11c and executing it by the CPU 11a.

Figure 3:
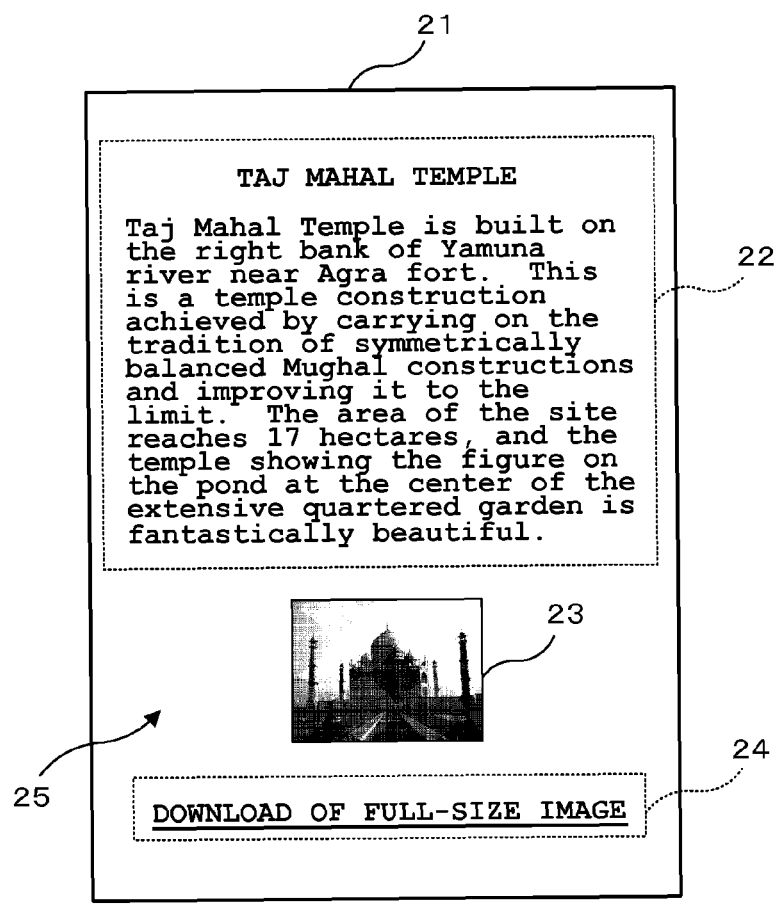
FIG. 3 is a diagram showing an example of a screen display when a Web service is being used.

FIG. 3 is a diagram showing an example of screen display when a Web service is being used. In the diagram, a screen 21 of the display section 15 is displaying, for example, a Web page 25 including an explanation displaying area 22, a thumbnail-image displaying area 23, and an anchor displaying area 24. An explanation of the Web page 25 is displayed in the explanation displaying area 22, a thumbnail image acquired by reducing an original image is displayed in the thumbnail-image displaying area 23, and a link character string is displayed in the anchor displaying area 24 as anchor information to the original image (full-size image) of the thumbnail image.

The link character string refers to a character string whose front and back have been sectioned by the href attribute of the a element of a hypertext language such as HTML (HyperText Markup Language). Specifically, the link character string refers to a character string described as <a href="URL"> download a full-size image </a> in the source of the Web page 25. "URL" includes an existing location (address) of an original image in the network 18.

When the user 16 touches a portion of this character string ("download a full-size image"), the processing section 11 downloads the original image of a thumbnail image from a predetermined location (a location specified by "URL") of the network 18.

Generally, the file size of the original image of a thumbnail image is considerably large (even reaches several M bytes to several tens M bytes depending on the size and image quality of the image). Therefore, normally, the time required for downloading an original image is considerably long compared with that of the Web page 25 containing only the text information and the thumbnail image. As a matter of course, the time required for downloading depends on the communication speed and communication quality. However, the relation where "the time required for downloading an original image" is longer than "the downloading time of the Web page 25" is generally constant.

First Embodiment

The point of a first embodiment is that, when a "particular operation" that is a trigger (cause) for starting time-consuming processing (in the case of the above-described example, the processing for downloading an original image having a large file size) is performed, the backlight 20 is turned off so as to be in a power-saving state until processing executed in response to the operation is completed, whereby the battery life is improved.

Hereinafter, operations for actualizing the point of the first embodiment will be explained in detail.

Figure 4:
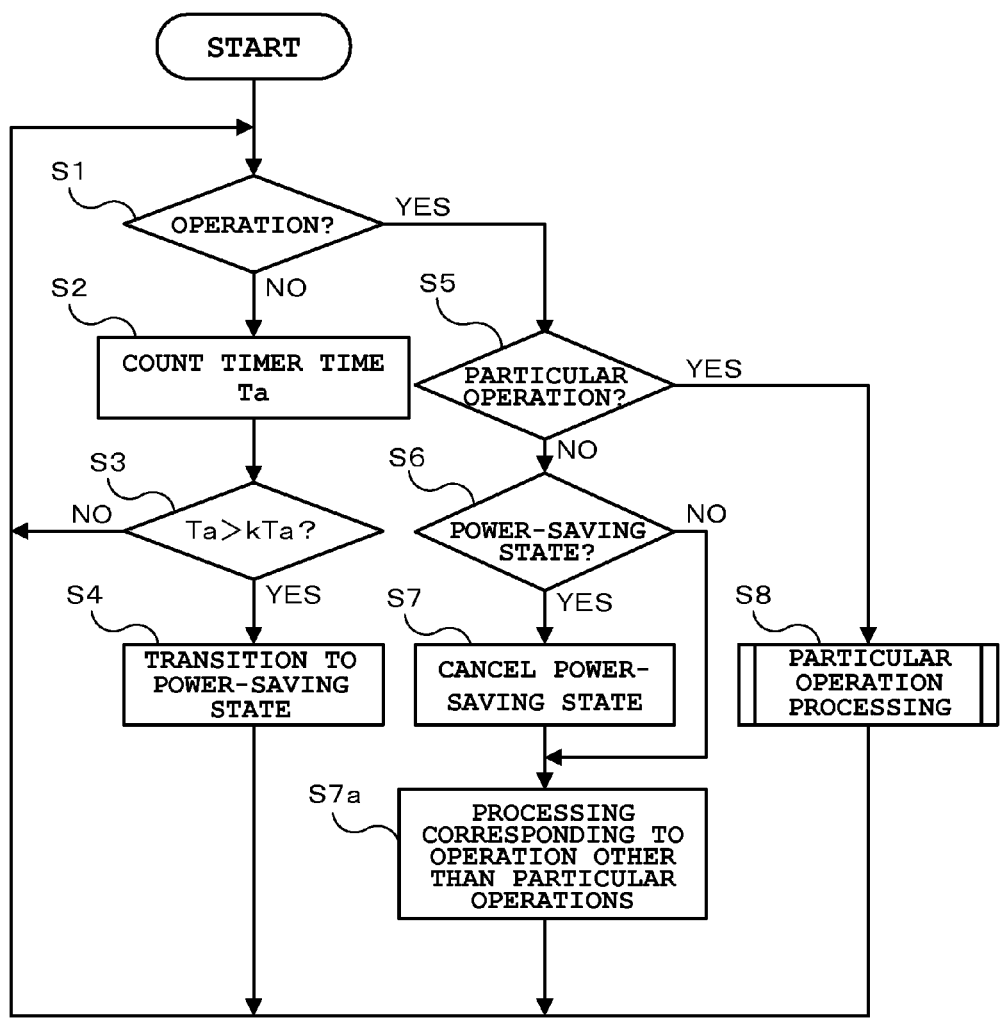
FIG. 4 is a diagram showing a control program to be executed by a CPU 11a of a processing section 11.

FIG. 4 is a diagram showing a control program to be executed by the CPU 11a of the processing section 11. This control program is an excerpted portion of control programs to be executed by the CPU 11a, which is related to the point of the embodiment and has been simplified (schematized) in order to facilitate understanding of the flow thereof. This program is repeatedly executed by the CPU 11a in every extremely short predetermined cycle. Accordingly, although a subject performing the operations described below (a subject to perform the control) is not clearly stated every time, it is the CPU 11a of the processing section 11.

When this control program is started, first, the CPU 11a judges whether or not an operation by the user 16 has been performed (Step S1). This operation by the user 16 refers to an operation by the user 16 that is performed on the operation section 10 when necessary. Specifically, this operation refers to an operation of touching the touch panel 3, an operation of pressing the physical key 7, or an operation of turning on or off the power switch 8.

When a judgment result at Step S1 is NO, or in other words, when an operation by the user 16 is judged not to have been performed, the CPU 11a clocks timer time Ta by using the time measuring section 14 (Step S2). Then, the CPU 11a compares the timer time Ta with predetermined time (power-saving transition time kTa) and judges whether or not "Ta>kTa" has been satisfied (Step S3). When "Ta>kTa" has not been satisfied, the CPU 11a returns to Step S1. Conversely, when "Ta>kTa" has been satisfied, the CPU 11a turns off the backlight 20 to enter the power-saving state (Step S4) and returns to Step S1 to repeat the operation.

Accordingly, in these Steps S1 to S4, an effect is obtained in which a normal operation state where the backlight 20 is on can be maintained until the predetermined time (the power-saving transition time kTa) elapses, and a transition to the power-saving state where the backlight 20 is off can be made after the predetermined time (the power-saving transition time kTa) elapses.

When a judgment result at Step S1 is YES, or in other words, when an operation by the user 16 is judged to have been performed, first, the CPU 11a judges whether or not this operation is a "particular operation" (Step S5). As described above, the particular operation refers to an operation whose processing to be started in response thereto requires a long period of time, and an example thereof is the above-described operation serving as a trigger of the processing for downloading an original image having a large file size (touch operation on the anchor displaying area 24 of FIG. 3).

When the operation is not a "particular operation" (or in other words, when an operation other than particular operations has been performed), the CPU 11a judges whether or not the current state of the portable phone 1 is the power-saving state (Step S6). When the current state is the power-saving state, the CPU 11a cancels the power-saving state (Step S7) to return to the normal state, performs processing corresponding to the operation other than particular operations (Step S7a), and then returns to Step S1. When the current state is not the power-saving state, the CPU 11a performs the processing corresponding to the operation other than particular operations without changing the state (Step S7a), and then returns to Step S1.

Accordingly, in these Steps S5 to S7, an effect is obtained in which, when an operation other than particular operations is performed in the power-saving state, the CPU 11a immediately cancels this state and returns to the normal state (the state where the backlight 20 is on).

When judged at Step S5 that a "particular operation" has been performed, the CPU 11a executes particular operation processing (Step S8).

Figure 5:
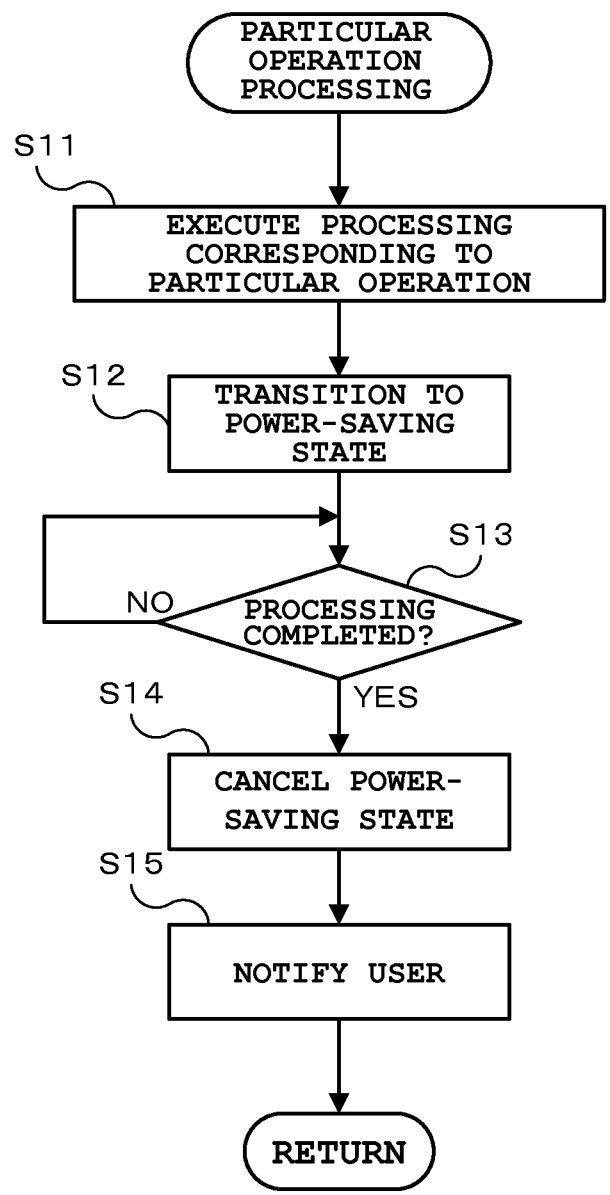
FIG. 5 is a diagram showing particular operation processing in a first embodiment.

FIG. 5 is a diagram showing the particular operation processing of the first embodiment. In this processing, first, the CPU 11a starts processing corresponding to the particular operation (Step S11). For example, when the particular operation is an operation of touching the anchor displaying area 24 of FIG. 3, the processing corresponding to the particular operation is processing for downloading the original image of a thumbnail image. As described above, the file size of the original image of a thumbnail image is large, and the downloading thereof requires considerable time. Therefore, in this period, the CPU 11a turns off the backlight 20 to make a transition to the power-saving state in order to improve the battery life (Step S12). Then, the CPU 11a waits for the completion of the processing corresponding to the particular operation (in this case, the processing for downloading the original image of the thumbnail image) (Step S13). When the processing is completed, the CPU 11a turns on the back light 20 to cancel the power-saving state (Step S14), and notifies the user 16 of the fact that the power-saving state has been canceled, the fact that the downloading has been completed, or both of the facts by, for example, sound, vibration, or screen display (Step S15). Then, the CPU 11a returns to the process of FIG. 4.

Accordingly, in the particular operation processing, an effect is obtained in which the backlight 20 can be turned off to enter the power-saving state and improve the battery life when time-consuming processing is being executed, and the power-saving state can be immediately returned to the normal state when the processing is completed.

Note that, when the processing (downloading) is judged to have been completed at Step S13, the CPU 11a immediately turns on the backlight 20 at Step S14 to cancel the power-saving state. However, the present invention is not limited thereto. For example, when downloading a compressed moving image such as MPEG (Moving Picture Expert Group), the CPU 11a performs moving image decompression processing, processing for storing into a buffer in order to ensure smoothness in moving image playback, and the like. Accordingly, the playback of the moving image is started after the storing processing. Therefore, the processing (downloading) completion judgment at Step S13 is preferably performed at a time point when the playback of the moving image is enabled to be started, or in other words, at a time point when the user 16 is enabled to view the image. As a result of this configuration, the backlight 20 can be kept off even when the moving image decompression processing, the processing for storing into the buffer in order to ensure smoothness in moving image playback, and the like are being performed, and electric power can be further saved.

Also, the timing of giving the notification to the user 16 at Step S15 is not limited to the point of the completion of the download (the point of the termination of communication), and the notification may be given when the user 16 is enabled to visually check the site information thereof on the screen of the display section 15. "When the user is enabled to visually check" indicates a time point when the user is enabled to understand the information completely or when the user is enabled to approximately understand the information. For example, in a case where a rough image is changed to a fine image along with the progress of the reading of a file, such as in the case of interlaced GIF (Graphics Interchange Format), the above-described time point when the user is enabled to approximately understand the information is an arbitrary point during the change (a time point when the user is enabled to recognize the contents of the image).

Figure 6:
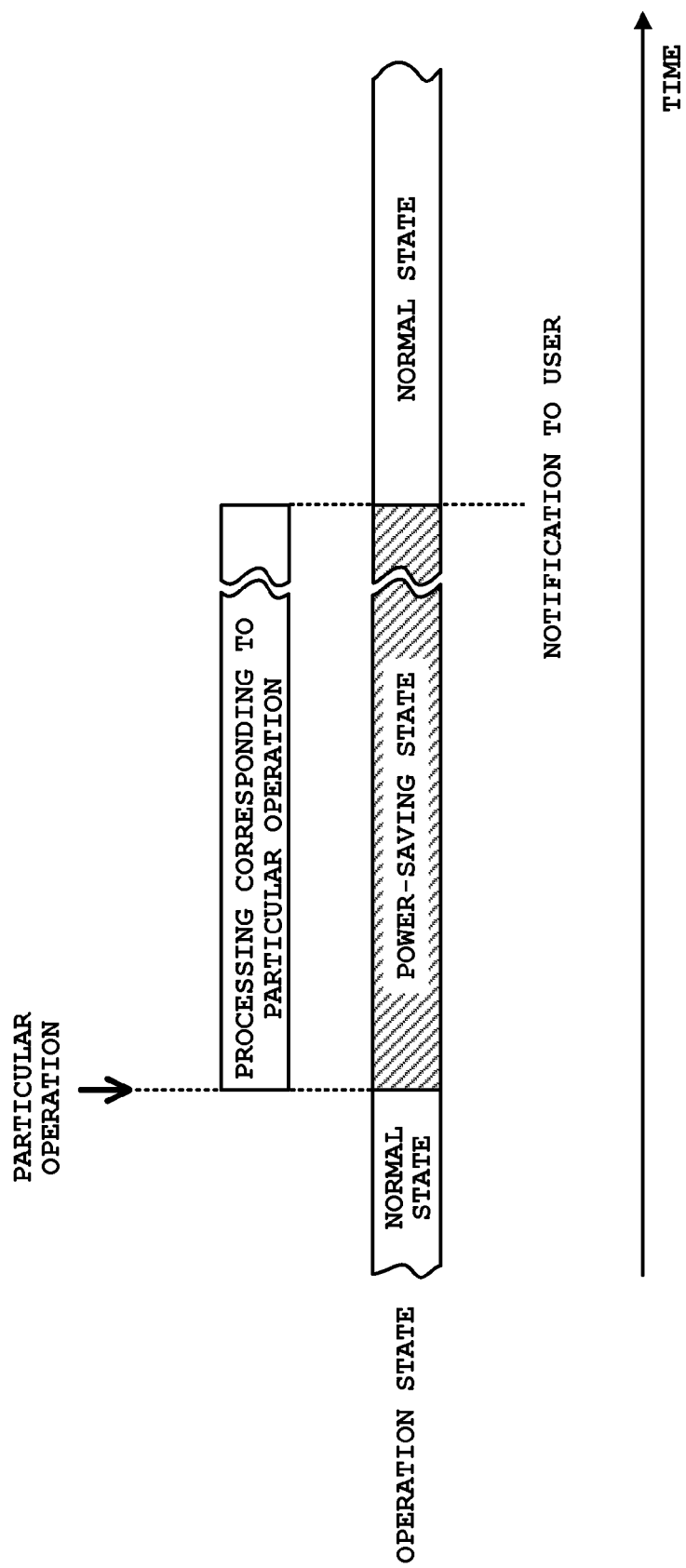
FIG. 6 is an explanatory diagram of the particular operation processing in the first embodiment.

FIG. 6 is an explanatory diagram of the particular operation processing of the first embodiment. The operation state of the portable phone 1 is, at first, the normal state where the backlight 20 is on. However, when a "particular operation" that is the trigger (cause) of time-consuming processing (in the above-described example, the processing for downloading the original image of a thumbnail image) is performed, the CPU 11a immediately changes the operation state of the portable phone 1 to the power-saving state (the state where the backlight 20 is off). Then, when this processing is completed (more precisely, when the user is enabled to view the image), the CPU 11a returns the operation state of the portable phone 1 from the power-saving state (the state where the backlight 20 is off) to the normal state (the state where the backlight 20 is on).

Accordingly, in the first embodiment, an effect is obtained in which, when time-consuming processing (processing corresponding to a particular operation) is being performed, the operation state of the portable phone 1 is changed to the power-saving state where the backlight 20 is off, whereby battery consumption during this period can be suppressed and the battery life can be improved.

Also, since this effect does not involve the above-described "power-saving transition time" at all (Step S11 to Step S15 do not include any processing related to the power-saving transition time), setting the power-saving transition time to have a necessary and sufficient length (for example, a length of two minutes or more) does not cause any problem. That is, although it is preferable to shorten the power-saving transition time as much as possible from the viewpoint of improving the battery life, it adversely causes a defect that the backlight 20 is turned off while the user is seeing the screen and ends up deteriorating the usability. On the other hand, since the "power-saving transition time" is not involved at all in the particular operation processing of the first embodiment, this "power-saving transition time" can be set to have a necessary and sufficient length. As a result, a unique effect that battery life can be improved without deteriorating usability can be obtained.

Second Embodiment

In the above-described first embodiment, when processing corresponding to a particular operation is started, the CPU 11a immediately makes a transition to the power-saving state (Step S12). The processing corresponding to the particular operation is, for example, processing for downloading an original image having a large file size. The time required for the downloading is not always constant, and becomes fast or slow depending on the communication speed and communication quality. For example, in an environment where high-speed communication can be made, as a matter of course, the downloading is highly likely completed in a short period of time. When a transition to the power-saving state is made in such a case, the screen is suddenly darkened, which causes the user 16 to feel unnaturalness. Therefore, in this case, it is preferable not to make a transition to the power-saving state.

Figure 7:
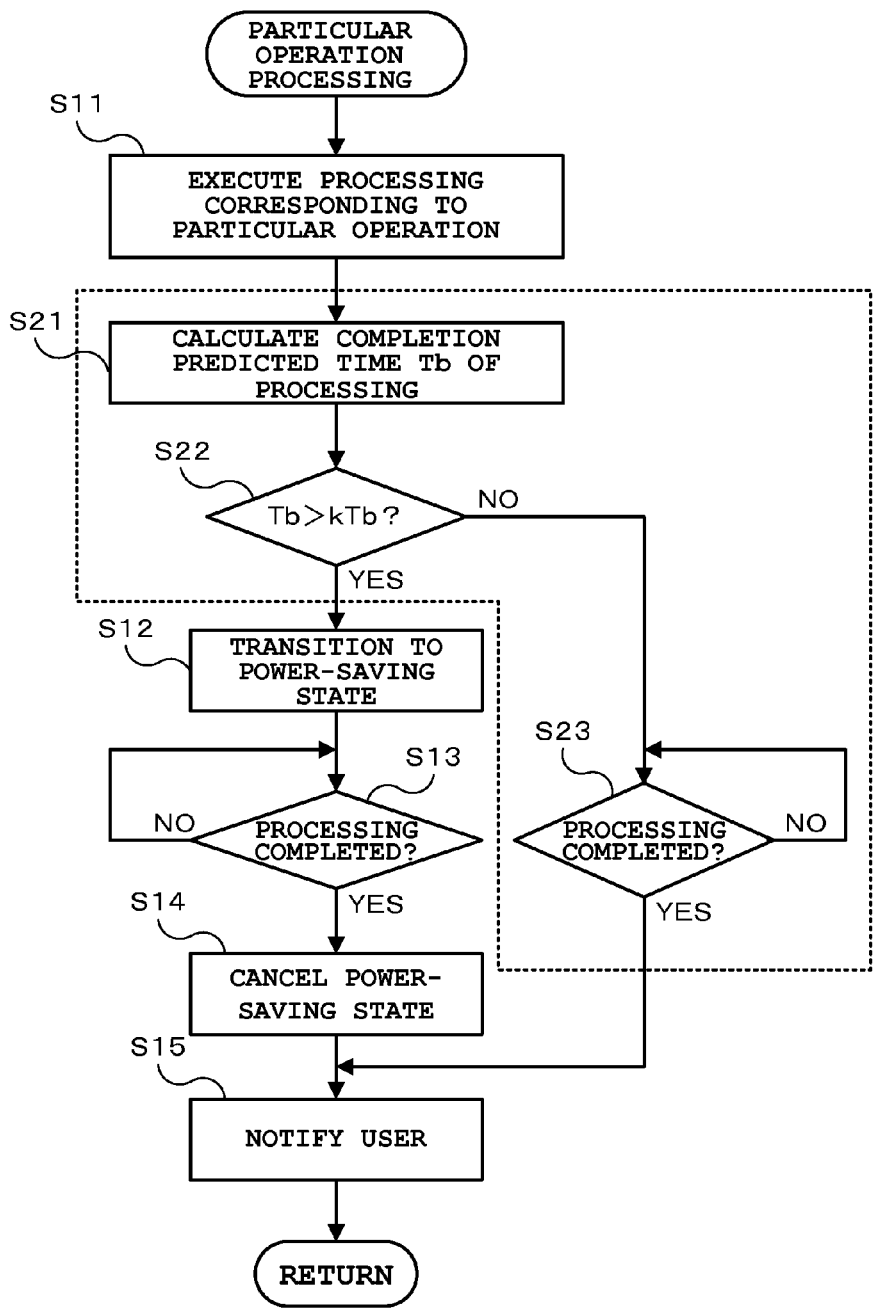
FIG. 7 is a diagram showing particular operation processing in a second embodiment.

FIG. 7 is a diagram showing particular operation processing of a second embodiment. This particular operation processing is a modification example of the particular operation processing of FIG. 5 and different from the particular operation processing of FIG. 5 in that Step S21 of calculating completion predicted time Tb for processing corresponding to a particular operation (for example, in the case of the download of an original image, the time is calculated based on the file size of the original image and the communication speed) and Step S22 of comparing the completion predicted time Tb with predetermined reference time kTb and judging whether "Tb>kTb" has been satisfied are added after Step S11. When a judgment result at Step S22 is YES, operations at and after Step S12 of FIG. 5 are performed. When a judgment result at Step S22 is NO, added Step S23 is performed at which Step S15 of FIG. 5 is performed after completion of the processing corresponding to the particular operation.

Accordingly, in the second embodiment, the CPU 11a can be configured not to make a transition to the power-saving state when the completion predicted time (Tb) for processing corresponding to a particular operation is shorter than the predetermined reference time (kTb). As a result, the CPU 11a can be configured not to make a transition to the power-saving state when processing corresponding to a particular operation is predicted to be completed in a short period of time (time determined by kTb), which can prevent the user 16 from feeling unnaturalness.

Third Embodiment

In the above descriptions, the processing for downloading an original image having a large file size has been described as an example of processing corresponding to a particular operation. However, the present invention is not limited thereto, and it may be, for example, processing for downloading both of a text and an image as long as the processing consumes time.

For example, when the user 16 performs an operation (particular operation) of directly inputting the URL of the Web page 25 or an operation (particular operation) of selecting a link (not shown) to the Web page 25 in order to view the Web page 25 of FIG. 3 described above, the CPU 11a of the processing section 11 performs serial control by which the Web page 25 is downloaded from the server 19 via the communication section 12 and the network 18, and the downloaded data (Web page 25) is displayed on the display section 15.

The Web page 25 of FIG. 3 is structured to include mixed data of texts and image, or in other words, the explanation displaying area 22, the thumbnail-image displaying area 23, and the anchor displaying area 24. The data of the explanation displaying area 22 and the anchor displaying area 24 are texts, and the data of the thumbnail-image displaying area 23 is an image. Generally, downloading of texts having a small data volume is completed fast, and downloading of an image having a large data volume is completed slow (as compared to downloading of texts). However, in an environment where communication speed is extremely low, downloading of texts as well as downloading of images consumes time in some cases.

As such, in an environment where communication speed is extremely low, even downloading of texts sometimes requires long waiting time depending on the communication speed. Therefore, a transition to the power-saving state in an environment where communication speed is extremely low is preferably made from a time point at which the waiting time is started. That is, in a case where the Web page 25 of FIG. 3 is downloaded, the transition is preferably made from the starting point of the download of both texts and image. On the other hand, in view of the fact that the contents of the Web page 25 can be tentatively understood only by the text data, returning from the power-saving state in the environment where communication speed is extremely low is preferably performed at a time point at which the downloading of the text data is completed.

Figure 8:
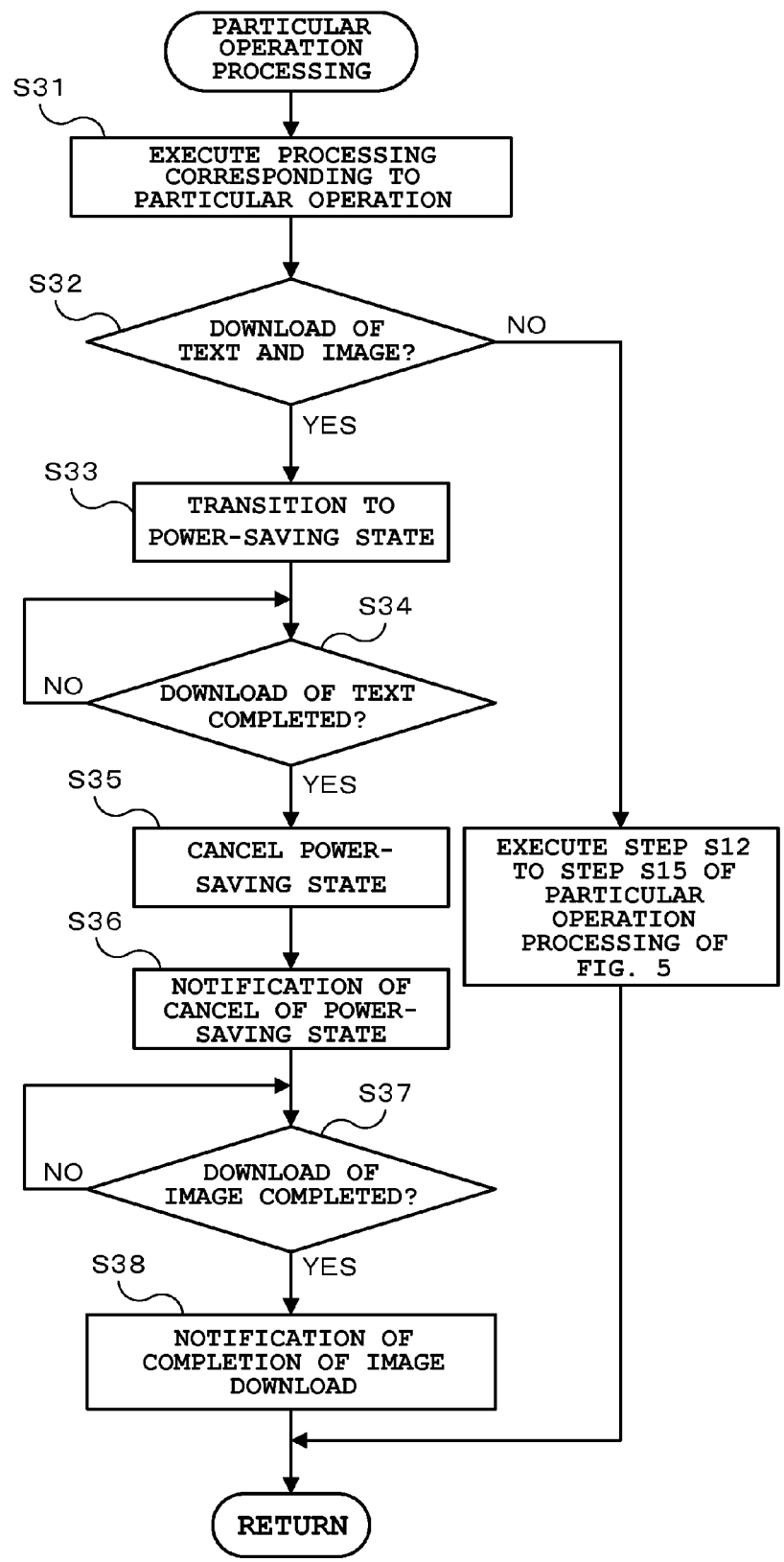
FIG. 8 is a diagram showing particular operation processing in a third embodiment.

FIG. 8 is a diagram showing particular operation processing of a third embodiment. In this processing, first, processing corresponding to a particular operation (in this case, processing for downloading the Web page 25 of FIG. 3 for convenience of explanation) is started (Step S31).

Then, the CPU 11a judges whether or not the above-described processing is processing for downloading both of a text (s) and an image(s) (Step S32). When the judgment result thereof is NO, the CPU 11a performs Steps S12 to S15 of FIG. 5, ends the flow, and returns to the processing of FIG. 4. However, in this case, the processing is processing for downloading the Web page 25 of FIG. 3, and therefore the judgment result of Step S32 is YES. Accordingly, the CPU 11a immediately makes a transition to the power-saving state (state where the backlight 20 is off) (Step S33).

Then, the CPU 11a waits until the downloading of the texts is completed (Step S34). When the downloading of the texts is completed, the CPU 11a immediately cancels the power-saving state to return to the normal state (the state where the backlight is on) (Step S35), notifies the user 16 of the fact that the power-saving state has been cancelled (Step S36) by, for example, sound, vibration, or screen display, and waits until the downloading of the image is completed (Step S37).

Then, when the downloading of the image is completed, the CPU 11a notifies the user 16 of the fact that the downloading of the image has been completed (Step S38) by, for example, sound, vibration, or screen display, and returns to the processing of FIG. 4. The completion of the downloading of the image may be judged not only when the communication is completed but also when the user 16 is enabled to visually check the image on the screen of the display section 15. In this case, "when the user is enabled to visually check" indicates a time point when the user is enabled to visually check the completely replayed image or a time point when the user is enabled to approximately understand the image. For example, in a case where a rough image is changed to a fine image along with the progress of the reading of a file, such as in the case of interlaced GIF, the above-described time point when the user is enabled to approximately understand the image is an arbitrary point during the change (a time point when the user is enabled to recognize the contents of the image).

Thus, in the particular operation processing, an effect is obtained in which a transition to the power-saving state is made at a time point when the downloading of both texts and images is started, and the power-saving state is cancelled to return to the normal state at a time point when the downloading of the texts is completed.

Figure 9:
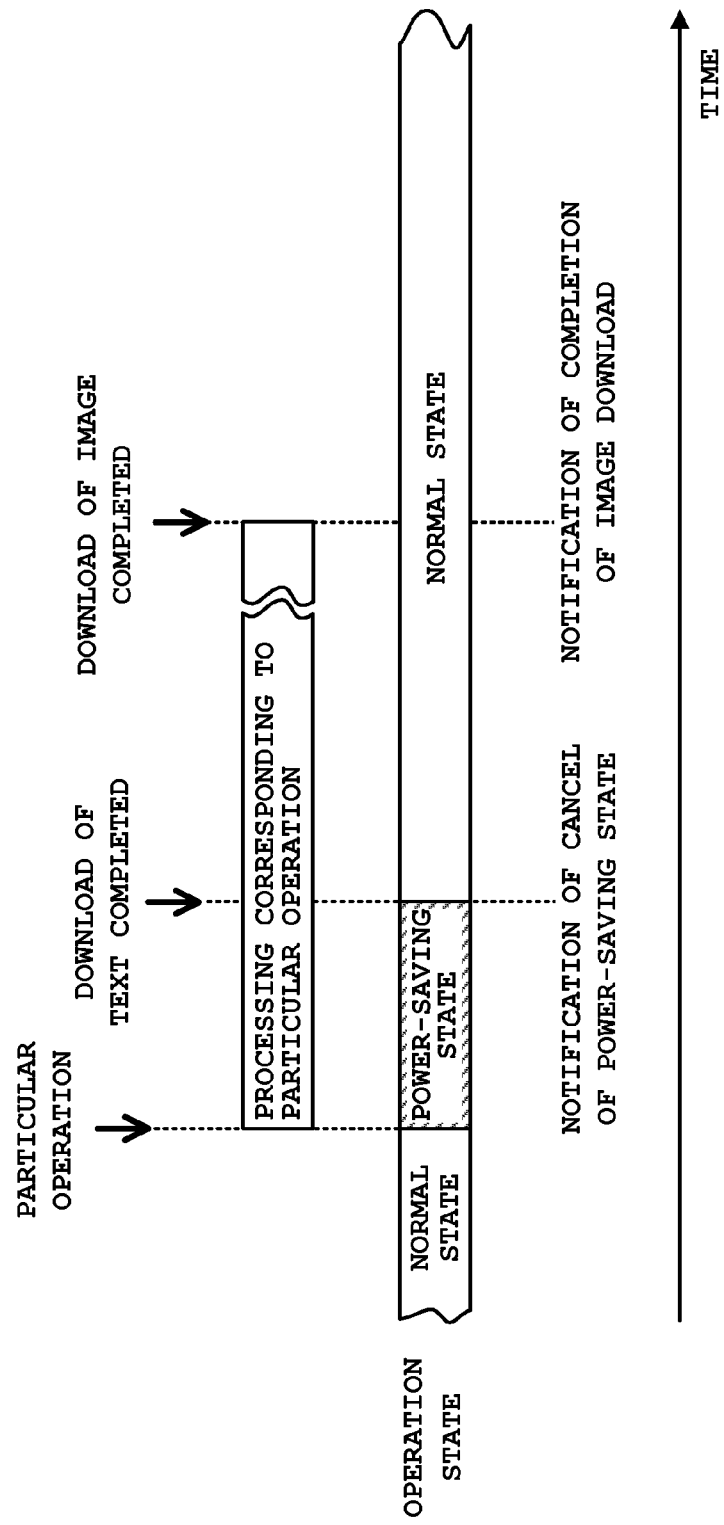
FIG. 9 is an explanatory diagram of the particular operation processing in the third embodiment.

FIG. 9 is an explanatory diagram of the particular operation processing of the third embodiment. The operation state of the portable phone 1 is, at first, the normal state where the backlight 20 is on. However, when a "particular operation" that is the trigger (cause) of time-consuming processing (in the example of FIG. 8, the processing for downloading the texts and image) is performed, the CPU 11a immediately makes a transition such that the operation state of the portable phone 1 is changed to the power-saving state (the state where the backlight 20 is off). Then, at the same time as the completion of the downloading of the texts in the processing, the CPU 11a causes the operation state of the portable phone 1 to return from the power-saving state (the state where the backlight 20 is off) to the normal state (the state where the backlight 20 is on).

Thus, in the third embodiment, the operation state of the portable phone 1 is the power-saving state where the backlight 20 is off until the downloading of texts in time-consuming processing is completed. Accordingly, an effect is obtained in which battery consumption during this period can be suppressed and the battery life can be improved. Also, the operation state returns to the normal state where the backlight 20 is on at the time point when the downloading of the texts is completed. Accordingly, an effect is obtained in which the user can tentatively understand the contents of the Web page 25 by viewing the texts.

Fourth Embodiment

The particular operation processing of FIG. 5, FIG. 7, or FIG. 8 may be further improved as described above.

Figure 10:
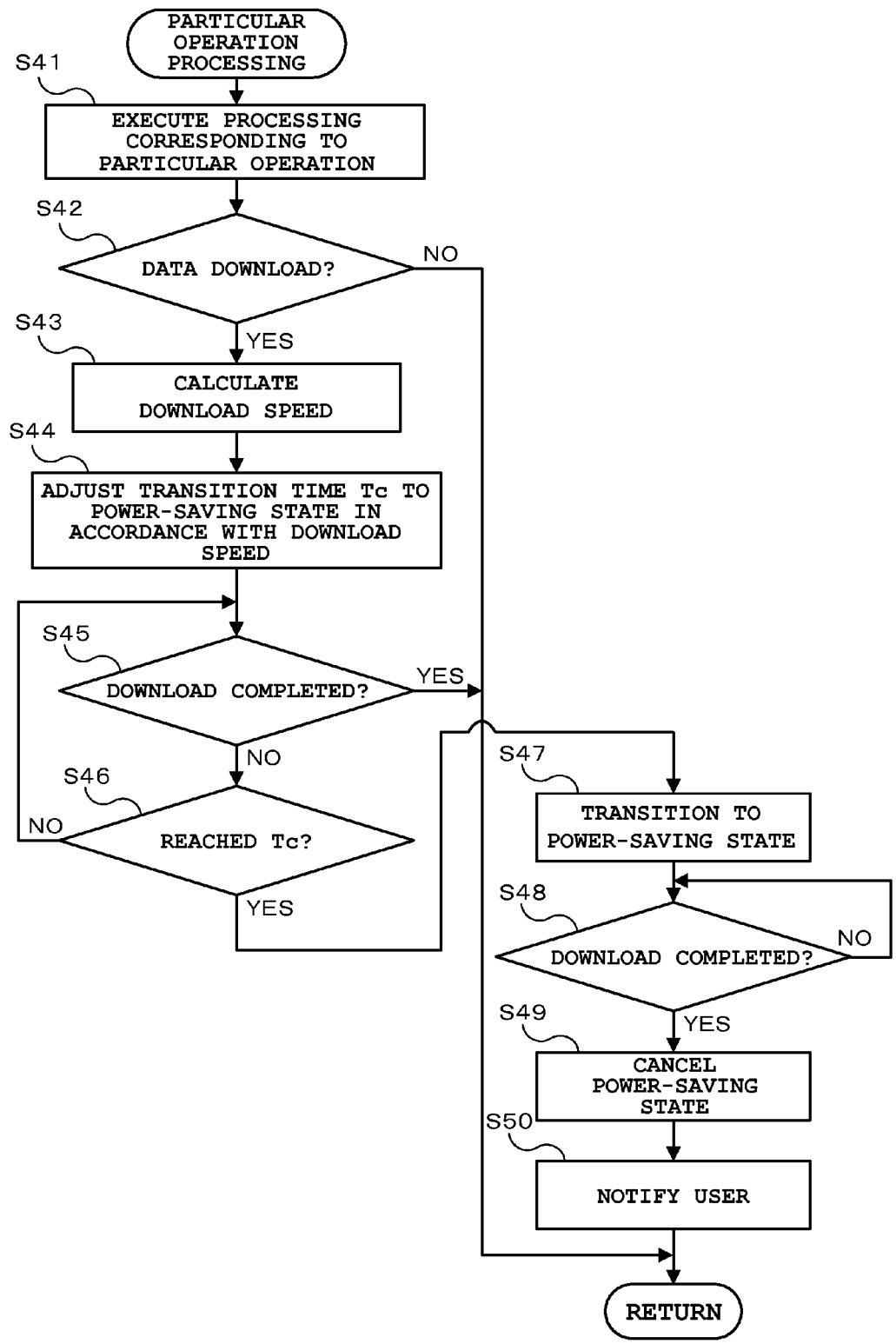
FIG. 10 is a diagram showing particular operation processing in a fourth embodiment.

FIG. 10 is a diagram showing a particular process operation of a fourth embodiment. In this processing, first, the CPU 11a starts processing corresponding to a particular operation (Step S41) and then judges whether or not the processing is data downloading (Step S42).

When it is not data downloading, the CPU 11a returns to the flow of FIG. 4. On the other hand, When it is data downloading, the CPU 11a calculates an index value indicating a downloading speed thereof (Step S43). The index value indicating a downloading speed refers to an index value indicating a data communication volume per unit time or an index value correlated thereto. For example, when the data volume of a downloading target is A and the data communication volume per unit time is B, the index value refers to an index value indicating the degree of the ratio of B with respect to A. This index value is a large value in an environment where a communication speed is fast, and is a small value in an environment where a communication speed is slow.

After calculating the index value indicating the downloading speed, the CPU 11a adjusts transition time Tc to the power-saving state in accordance with the index value (Step S44) and then judges whether or not the downloading has been completed (Step S45).

Then, when the downloading has been completed, the CPU 11a ends the flow without change and returns to the processing of FIG. 4. On the other hand, when the downloading has not been completed, the CPU 11a judges whether or not the time elapsed from the start of the downloading to the current point has reached the transition time Tc to the power-saving state (Step S46).

When the judgment result at Step S46 is NO, or in other words, when the time elapsed from the start of the downloading to the current point has not reached the transition time Tc to the power-saving state, the CPU 11a returns to Step S45. On the other hand, when the judgment result at Step S46 is YES, or in other words, when the time elapsed from the start of the downloading to the current point has reached the transition time Tc to the power-saving state, the CPU 11a immediately makes a transition to the power-saving state (Step S47).

Then, the CPU 11a waits until the downloading is completed (Step S48). When the downloading is completed, the CPU 11a cancels the power-saving state to return to the normal state (Step S49), notifies the user 16 of the fact that the electric-power saving state has been cancelled, the fact that the downloading has been completed, or both of the facts (Step S50) by, for example, sound, vibration, or screen display, and the CPU 11a then returns to the processing of FIG. 4.

Accordingly, in the particular operation processing, an effect is obtained in which transition time Tc to the power-saving state can be adjusted in accordance with an index value indicating a downloading speed or an index value correlated thereto.

FIGS. 11(a) and 11(b) are explanatory diagrams of the particular operation processing in the fourth embodiment. As shown in FIG. 11(a), when an index value indicating a downloading speed is high, transition time Tc to the power-saving state is set to have a comparatively large value (comparatively long value) in accordance with the index value. Therefore, the transition time Tc to the power-saving state is not reached even at the point of the completion of the downloading as well as a time point during the data downloading. In this case, the CPU 11a does not make a transition to the power-saving state and maintains the normal state. On the other hand, as shown in FIG. 11(b), when an index value indicating a downloading speed is low, transition time Tc to the power-saving state is set to have a comparatively small value (comparatively short value) in accordance with the index value. Therefore, the transition time Tc to the power-saving state is reached during the data downloading. In this case, the CPU 11a makes a transition to the power-saving state at a time point at which the transition time Tc is reached, cancels the power-saving state to return to the normal state at a time point when the downloading is completed.

Accordingly, in the fourth embodiment, characteristic are provided in which a transition to a power-saving state value is not easily made when an index value is large (in other words, the case of an environment where a communication environment is fast) and a transition to a power-saving state value is easily made when an index value is small (in other words, the case of an environment where a communication environment is slow), whereby an effect is obtained in which power-saving state control suitable for a communication environment can be performed. As a result, a practical technique matched with an actual usage situation can be provided.

Note that, although the power-saving state is a state where the backlight 20 is off in the above-descriptions, it is not limited to the turn-off (stop of operation) of the backlight and may be the luminance reduction (suppression of operation) of the backlight 20. Alternatively, a display circuit (diver, etc.) of the two-dimensional display device 4 may be in an inactive state or an operation suppressed state, or a combination with an inactive state or an operation suppressed state of another circuit may be used.

That is, the power-saving state may be any state as long as the operation of at least a hardware section(s) not related to time-consuming processing is stopped or suppressed. The backlight 20 is only an example of the hardware section.

Also, the "particular operation" is not limited to an operation of selecting an anchor (see the anchor displaying area 24 of FIG. 3). For example, the particular operation may be the selection of a bookmark or the direct input (URL input) of a homepage address, etc. Alternatively, the particular operation may be a re-reading operation (reloading operation) of a once-read address.

Moreover, the present invention is not limited to be applied to a portable phone. For example, the present invention can be applied to tablet PCs (Personal Computers), laptop PCs, PDAs (Personal Data Assistants: portable information terminals), and game machines. That is, the present invention can be applied to all types of electronic devices having a function as a network terminal.

This application is based upon and claims the benefit of priority from the prior Japanese Patent Application No. 2012-264306, filed Dec. 3, 2012, the entire contents of which are incorporated herein by reference.

Hereinafter, Supplementary Notes describe the characteristics of the present invention.

The above-described embodiments can be partially or entirely described as in the following Supplementary Notes; however, the embodiments are not limited to these Supplementary Notes.

(Supplementary Note 1)

Figure 12:
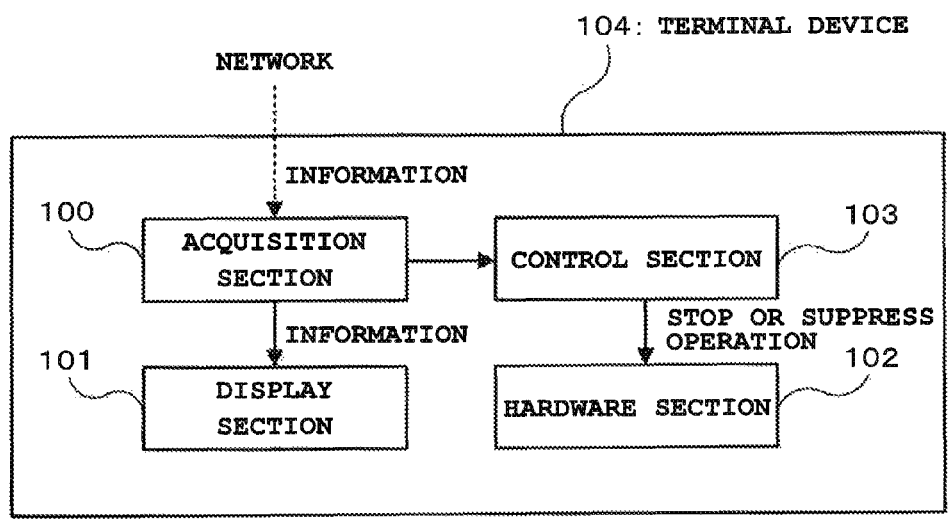
FIG. 12 is a configuration diagram of Supplementary Note 1.

FIG. 12 is a configuration diagram of Supplementary Note 1.

Supplementary Note 1 is a terminal device 104 (corresponding to the portable phone 1 of the embodiments) comprising:

an acquisition section 100 (corresponding to the communication section 12 of the embodiments) for acquiring information on a network;

a display section 101 (corresponding to the display section 15 of the embodiments) for displaying the information; and a control section 103 (corresponding to the processing section 11 of the embodiments) for controlling to stop or suppress operation of a hardware section 102 (corresponding to the backlight 20 of the embodiments) excluding at least the acquisition section 100 while the information is being acquired by the acquisition section 100.

According to Supplementary Note 1, the operation of the hardware section can be stopped or suppressed while the information is being acquired from the network, whereby power consumption can be reduced by the amount of the operation stop or the operation suppression, and the battery life can be extended.

(Supplementary Note 2)

Supplementary Note 2 is the terminal device according to Supplementary Note 1, further comprising:

a calculation section for calculating acquisition predicted time for the information to be acquired by the acquisition section, wherein the control section controls to stop or suppress the operation of the hardware section excluding at least the acquisition section while the information is being acquired by the acquisition section, when the acquisition predicted time exceeds predetermined reference time.

According to Supplementary Note 2, the operation of the hardware section is stopped or suppressed only when the acquisition predicted time for the information exceeds the predetermined reference time. Therefore, the usability can be improved without performing unnecessary electric power control.

(Supplementary Note 3)

Supplementary Note 3 is the terminal device according to Supplementary Note 1, wherein the information to be acquired by the acquisition section is mixed information of text information and image information; and the control section controls to stop or suppress the operation of the hardware section excluding at least the acquisition section while the text information is being acquired by the acquisition section.

According to Supplementary Note 3, the stop or suppression of the operation of part of the hardware section is canceled when the acquisition of the text information is completed. Accordingly, the contents of the information can be checked by the acquired text information being displayed.

(Supplementary Note 4)

Supplementary Note 4 is the terminal device according to Supplementary Note 1, further comprising:

a calculation section for calculating an acquisition speed for the information to be acquired by the acquisition section, wherein the control section controls time that elapses before the operation of the hardware section excluding the acquisition section is stopped or suppressed in accordance with the acquisition speed.

According to Supplementary Note 4, the time that elapses before the operation of the hardware section is stopped or suppressed is controlled in accordance with the acquisition speed of the information. Therefore, power-saving control corresponding to the level of communication quality can be performed.

(Supplementary Note 5)

Supplementary Note 5 is a control method for a terminal device characterized by including comprising:

an acquisition step of acquiring information on a network;

a display step of displaying the information; and a control step of controlling to stop or suppress operation of at least a hardware section not required for the acquisition step while the information is being acquired by the acquisition step.

According to Supplementary Note 5, effects similar to those of Supplementary Note 1 can be obtained.

(Supplementary Note 6)

Supplementary Note 6 is a non-transitory computer-readable storage medium having a program stored thereon that is executable by a computer of a terminal device to actualize functions comprising:

an acquisition section for acquiring information on a network;

a display section for displaying the information; and a control section for controlling to stop or suppress operation of a hardware section excluding at least the acquisition section while the information is being acquired by the acquisition section.

According to Supplementary Note 6, effects similar to those of Supplementary Note 1 can be obtained.

DESCRIPTION OF REFERENCE NUMERALS 100 acquisition section
101 display section
102 hardware section
103 control section
104 terminal device

What is claimed is:

1. A terminal device comprising:
a communication section configured to acquire information on a network;
a display section for displaying the information; and
a processing section for controlling to stop or suppress an operation of a hardware section excluding at least the communication section while the information is being acquired by the communication section,
wherein the processing section is further configured to:
judge whether the information acquired by the communication section is mixed information of text information and image information; and
when judged that the information is mixed information of text information and image information, controls to stop or suppress the operation of the hardware section excluding at least the communication section only while the text information is being acquired by the communication section.

2. The terminal device according to claim 1, wherein the processing section is further configured to:
  calculate an acquisition predicted time for the information to be acquired by the communication section,
  control to stop or suppress the operation of the hardware section excluding at least the communication section while the information is being acquired by the communication section, when the acquisition predicted time exceeds a predetermined reference time.

3. The terminal device according to claim 1, wherein the processing section is further configured to:
  calculate an acquisition speed for the information to be acquired by the acquisition communication section, and
  to control a time that elapses before the operation of the hardware section excluding the communication section is stopped or suppressed in accordance with the acquisition speed.

4. A control method for a terminal device comprising:
  acquiring information on a network;
  displaying the information;
  processing to stop or suppress an operation of at least a hardware section not required for the acquiring information on the network while the information is being acquired;
  judging whether the information is mixed information of text information and image information; and
  when judged that the information is mixed information of text information and image information, controlling to stop or suppress the operation of the hardware section excluding at least the acquiring of information only while the text information is being acquired.

5. A non-transitory computer-readable storage medium having a program stored thereon that is executable by a computer of a terminal device to actualize functions comprising:
  acquiring information on a network;
  displaying the information; and
  processing to stop or suppress operation of a hardware section excluding at least the acquiring information on the network while the information is being acquired by the acquisition section;
  judging whether the information is mixed information of text information and image information; and
  when judged that the information is mixed information of text information and image information, controlling to stop or suppress the operation of the hardware section excluding at least the acquiring of information only while the text information is being acquired.

* * * * *